United States Patent
Haidari et al.

(10) Patent No.: US 12,511,927 B1
(45) Date of Patent: Dec. 30, 2025

(54) TEMPLATE IDENTIFICATION AND MATCHING FOR DATA ANALYSIS IN LARGE SETS OF DOCUMENTS

(71) Applicant: Actfore, Reston, VA (US)

(72) Inventors: Ali Haidari, Ashburn, VA (US); Sanskriti Shivhare, Washington, DC (US); Syeda Yumna Batool Zaidi, Triangle, VA (US)

(73) Assignee: ACTFORE, Reston, VA (US)

( * ) Notice: Subject to any disclaimer, the term of this patent is extended or adjusted under 35 U.S.C. 154(b) by 0 days.

(21) Appl. No.: 19/050,830

(22) Filed: Feb. 11, 2025

(51) Int. Cl.
| | |
|---|---|
| *G06V 30/418* | (2022.01) |
| *G06F 16/93* | (2019.01) |
| *G06V 10/46* | (2022.01) |
| *G06V 10/75* | (2022.01) |

(52) U.S. Cl.
CPC ............ *G06V 30/418* (2022.01); *G06F 16/93* (2019.01); *G06V 10/462* (2022.01); *G06V 10/751* (2022.01)

(58) Field of Classification Search
CPC .. G06V 30/418; G06V 10/462; G06V 10/751; G06F 16/93
See application file for complete search history.

(56) References Cited

U.S. PATENT DOCUMENTS

| | | | | |
|---|---|---|---|---|
| 2008/0187249 A1* | 8/2008 | Konishi | ........... | G06V 30/18076 382/306 |
| 2017/0286415 A1* | 10/2017 | Kumar | ................. | G06F 16/434 |
| 2021/0110527 A1* | 4/2021 | Wheaton | ............... | G06T 7/0002 |
| 2021/0294851 A1* | 9/2021 | Talwadker | ............. | G06V 30/40 |
| 2021/0366099 A1* | 11/2021 | Liao | ...................... | G06F 40/216 |
| 2022/0067363 A1* | 3/2022 | Skoryukina | ............ | G06V 10/40 |
| 2022/0300762 A1* | 9/2022 | Hasegawa | ............ | G06V 10/945 |
| 2022/0392047 A1* | 12/2022 | Wheaton | ............... | G06V 10/40 |
| 2024/0249191 A1* | 7/2024 | Bowman | ................ | G06N 20/00 |

OTHER PUBLICATIONS

Rublee et al., "ORB: an efficient alternative to SIFT or SURF", 2011, IEEE International Conference on Computer Vision (Year: 2011).*

Andrianova et al. "An Approach to Image Matching Based on SIFT and ORB Algorithms", 2021, IEEE (Year: 2021).*

* cited by examiner

*Primary Examiner* — Aaron W Carter

(74) *Attorney, Agent, or Firm* — Whiteford, Taylor & Preston, LLP; Peter J. Davis

(57) ABSTRACT

In one aspect, a computer-implemented method includes accessing, by one or more processors, a plurality of documents stored in one or more databases; converting, by the one or more processors, each page of each document of the plurality of documents into a respective image that comprises a plurality of pixel key points and corresponding descriptors; identifying, by the one or more processors, based upon the plurality of pixel key points and corresponding descriptors for each page of each document of the plurality of documents, a plurality of unique templates corresponding to each document of the plurality of documents; and batching, by the one or more processors, a first list of documents based upon matching a first unique template of the plurality of unique templates included in a first document of the plurality of documents with other documents of the plurality of documents.

18 Claims, 9 Drawing Sheets

400a

Page:9 — 402

PALETTES & USAGE

2.5 Complimentary combinations
Ensure that there is sufficient contrast whenever combining different color combinations.

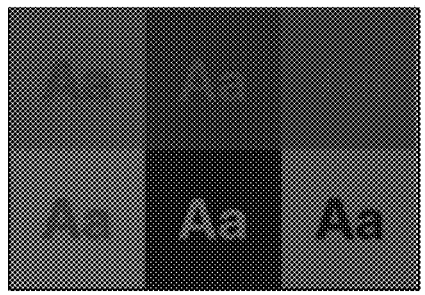

Page:13 — 404

USAGE & OPTIONS

We mine data
breaches accurately,
securely and fast.

Lorem ipsum dolor sit amet, consectetur adipiscing elit, sed do eiusmod tempor incididunt ut labore et dolore magna aliqua.

From breach to review, we're fast & secure.

Headline
Inter Variable
Letter-spacing: -3
Leading: 110%

Body copy
Inter Variable
Letter-spacing: 0
Leading: 110%

Sub-head
Inter Variable
Letter-spacing: 0
Leading: 120%

FIG. 4A

Page:9

PALETTES & USAGE

2.5 Complimentary combinations
Ensure that there is sufficient contrast whenever combining different color combinations.

Page:10

PALETTES & USAGE

2.8 Avoid these combos
Ensure that there is sufficient contrast whenever combining different color combinations whether it's text or graphics.

TEMPLATE IDENTIFICATION AND MATCHING FOR DATA ANALYSIS IN LARGE SETS OF DOCUMENTS

CROSS-REFERENCE TO RELATED APPLICATIONS

This application is also related to U.S. Non-Provisional patent application Ser. No. 19/066,964, filed on Feb. 28, 2025, entitled "Improved Character Recognition Techniques for Data Analysis in Large Sets of Documents"; and U.S. Non-Provisional patent application Ser. No. 19/066,809, filed on Feb. 28, 2025, entitled "Techniques for Targeted Data Extraction from Unstructured Sets of Documents"; the contents of which are hereby expressly incorporated by reference in their entirety.

FIELD OF DISCLOSURE

The present technology relates to the field of data mining and document review, and in particular template identification and matching for data analysis in large sets of documents for batch processing.

BACKGROUND

In today's digital age, with an ever-growing reliance on online communications, cybersecurity has become a critical priority for organizational management teams. Robust safeguards are essential to prevent or effectively mitigate cybersecurity breaches. However, in the event of such breaches (cyber incidents), organizations often rely on manual data review processes to identify compromised information and fulfill notification requirements.

This manual approach is fraught with inefficiencies—it is slow, error-prone, and ill-suited to address the increasing complexity and volume of modern data ecosystems. Teams are required to sift through diverse data types, languages, and formats, making this an arduous task that frequently results in delays and inaccuracies. Furthermore, the unstructured nature of the data poses significant challenges to efficient document processing, highlighting the urgent need for innovative solutions to address these inefficiencies.

SUMMARY

Aspects of the present disclosure are directed to addressing challenges associated with data/document review processes. More specifically, a pipeline (which can be automated) is configured to identify and categorize unique templates in one or more files, and then perform pairwise comparison to group files having similar templates into a plurality of clusters. The same file can be part of more than one cluster. Files included in each cluster may then be processed together (batch processed). Such processing can be, for example, for data analysis, data mining, and/or other known or to be developed data processing. Accordingly, manual efforts required for processing the plurality of documents for various tasks are reduced while improving workflow consistency.

In one aspect, a computer-implemented method includes accessing, by one or more processors, a plurality of documents stored in one or more databases; converting, by the one or more processors, each page of each document of the plurality of documents into a respective image that comprises a plurality of pixel key points and corresponding descriptors; identifying, by the one or more processors, based upon the plurality of pixel key points and corresponding descriptors for each page of each document of the plurality of documents, a plurality of unique templates corresponding to each document of the plurality of documents; and batching, by the one or more processors, a first list of documents based upon matching a first unique template of the plurality of unique templates included in a first document of the plurality of documents with other documents of the plurality of documents.

In another aspect, converting each page of each document of the plurality of documents includes generating the plurality of pixel key points and corresponding descriptors using an oriented fast and rotated brief (ORB) key point detector.

In another aspect, identifying the plurality of unique templates corresponding to each document of the plurality of documents includes comparing, using a brute force k-nearest neighbors algorithm, the plurality of pixel key points and corresponding descriptors for each page of the first document against a plurality of pixel key points and corresponding descriptors for one or more other pages of the first document; based on the comparing, generating a plurality of distances identifying similarity among all pages of the first document; in accordance with the plurality of distances, obtaining an image homography space and inliers and outliers of the plurality of distances corresponding to all pages of the first document; and based upon the image homography space and the inliers and outliers of the plurality of distances, identifying the plurality of unique templates corresponding to the first document.

In another aspect, batching the first list of documents based upon matching the first unique template further includes comparing, using a brute force k-nearest neighbors algorithm, a descriptor associated with the first unique template with other descriptors of remaining unique templates of the plurality of unique templates corresponding to each document of the plurality of documents; and based on the comparing, batching each document of the first list of documents having the first unique template.

In another aspect, the first list of documents having the first unique template is batched using a Lowe's ratio test.

In another aspect, the method further includes batching, by the one or more processors, a second list of documents based upon matching a second unique template of the plurality of unique templates included in the first document with other documents of the plurality of documents.

In another aspect, the second list of documents is batch processed.

In another aspect, the first list of documents is batch processed.

In another aspect, a first subset of the plurality of documents has a first format that is different than a second format of a second subset of the plurality of documents.

In one aspect, a system includes at least one memory configured to store computer-readable instructions, and at least one processor. The at least one processor is communicatively coupled with the at least one memory, and configured to execute the computer-readable instructions to access a plurality of documents stored in one or more databases communicatively coupled with the at least one processor; convert each page of each document of the plurality of documents into a respective image that comprises a plurality of pixel key points and corresponding descriptors; identify, based upon the plurality of pixel key points and corresponding descriptors for each page of each document of the plurality of documents, a plurality of unique templates corresponding to each document of the plurality of documents; and batch a first list of documents based upon matching a first unique template of the plurality of unique templates included in a first document of the plurality of documents with other documents of the plurality of documents.

In another aspect, the at least one processor is configured to execute the computer-readable instructions to generate the plurality of pixel key points and corresponding descriptors using an oriented rotated brief key point detector.

In another aspect, to identify the plurality of unique templates corresponding to each document of the plurality of documents, the at least one processor is configured to execute the computer-readable instructions to compare, using a brute force k-nearest neighbors algorithm, the plurality of pixel key points and corresponding descriptors for each page of the first document against a plurality of pixel key points and corresponding descriptors for one or more other pages of the first document; based on the comparing, generate a plurality of distances identifying similarity among all pages of the first document; in accordance with the plurality of distances, obtain an image homography space and inliers and outliers of the plurality of distances corresponding to all pages of the first document; and based upon the image homography space and the inliers and outliers of the plurality of distances, identify the plurality of unique templates corresponding to the first document.

In another aspect, to batch the first list of documents based upon matching the first unique template, the at least one processor is configured to execute the computer-readable instructions to compare, using a brute force k-nearest neighbors algorithm, a descriptor associated with the first unique template with other descriptors of remaining unique templates of the plurality of unique templates corresponding to each document of the plurality of documents; and based on the comparing, batch each document of the first list of documents having the first unique template.

In another aspect, the at least one processor is further configured to execute the computer-readable instructions to batch the first list of documents having the first unique template using a Lowe's ratio test.

In another aspect, the at least one processor is configured to execute the computer-readable instructions to batch a second list of documents based upon matching a second unique template of the plurality of unique templates included in the first document with other documents of the plurality of documents.

In another aspect, the second list of documents is batch processed.

In another aspect, the first list of documents is batch processed.

In another aspect, a first subset of the plurality of documents has a first format that is different than a second format of a second subset of the plurality of documents.

In one aspect, one or more non-transitory computer-readable media comprising machine-readable instructions stored thereon, which, when executed by at least one processor of at least one computing device communicatively coupled with one or more databases, cause the at least one processor to access a plurality of documents stored in the one or more databases; convert each page of each document of the plurality of documents into a respective image that comprises a plurality of pixel key points and corresponding descriptors; identify, based upon the plurality of pixel key points and corresponding descriptors for each page of each document of the plurality of documents, a plurality of unique templates corresponding to each document of the plurality of documents; and batch a first list of documents based upon matching a first unique template of the plurality of unique templates included in a first document of the plurality of documents with other documents of the plurality of documents.

In another aspect, the machine-readable instructions, which, when executed by the at least one processor, cause the at least one processor to batch a second list of documents based upon matching a second unique template of the plurality of unique templates included in the first document with other documents of the plurality of documents.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4A illustrates an example view of two pages of a document that are structurally different.

FIG. 5A illustrates an example view of two other pages of a document that are structurally similar.

DETAILED DESCRIPTION

Figure 1:
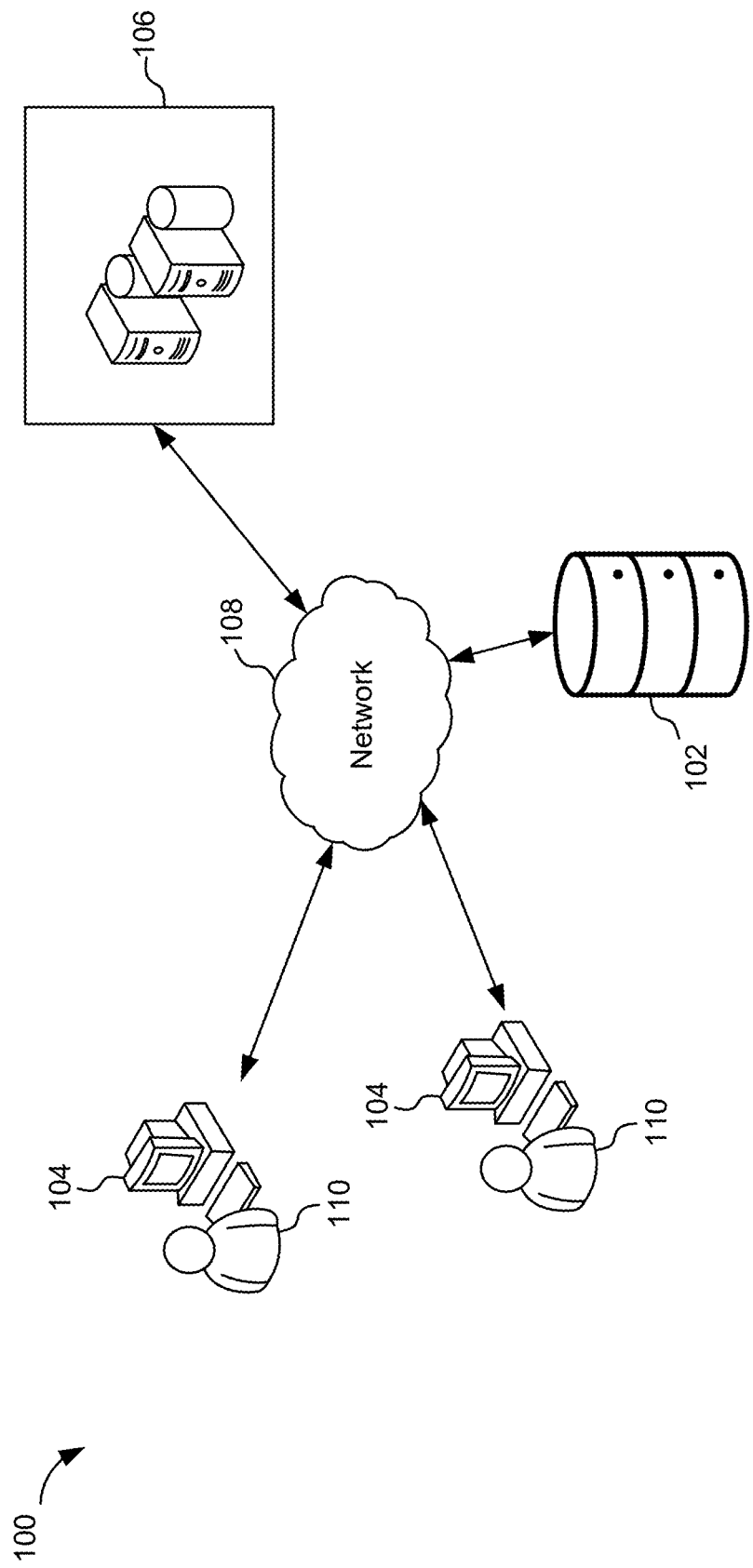
FIG. 1 illustrates a block diagram of an example network diagram according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

A used herein the term "configured" shall be considered to interchangeably be used to refer to configured and configurable unless the term "configurable" is explicitly used to distinguish from "configured." The proper understanding of the term will be apparent to persons of ordinary skill in the art in the context in which the term is used.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

As used herein, the term "configured" shall be considered to be used interchangeably with configured and configurable, unless the term "configurable" is explicitly used to distinguish from "configured." The proper understanding of the term will be apparent to persons of ordinary skill in the art in the context in which the term is used.

Various technical features may be readily apparent to one skilled in the art from the following figures, descriptions, and claims.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Aspects of the present disclosure can be implemented in any device, system or network that is capable of communicating with one or more client devices and one or more databases over a network. Alternatively, various aspects of the present disclosure can be implemented at a client device that is configured to store a plurality of documents at a local memory or access the plurality of documents stored at the one or more databases. The one or more databases are stored at one or more database servers.

As noted above, cybersecurity is an ever-present concern for any individual and/or organization with online presence. Robust safeguards are essential to prevent or effectively mitigate cybersecurity breaches. However, in the event of such breaches (cyber incidents), organizations often rely on manual data review processes to identify compromised information and fulfill notification requirements. This manual approach is fraught with inefficiencies—it is slow, error-prone, and ill-suited to address the increasing complexity and volume of modern data ecosystems.

Accordingly, aspects of the present disclosure are directed to addressing challenges associated with data/document review processes. In the present case, the data review processes are described in accordance with identifying, extracting, and compiling compromised information, meeting notification requirements, and/or any other known or desired data processing task. However, the data review processes, as described herein, may be used for other use cases as well, and solves issues riddled with inefficiencies, slow and error-prone processing due to growing complexity and volume of today's data structures.

A pipeline (which can be automated), according to various aspects of the present disclosure, streamlines handling of data stored in a plurality of documents. By way of an example, the plurality of documents includes data stored in portable document format (PDF) files. However, data stored in another format files, for example, word, etc., fall within the scope of the present disclosure.

A pipeline according to the present disclosure is configured to identify and categorize unique templates in one or more files, and then perform pairwise comparison to group files having similar templates into a plurality of clusters. The same file can be part of more than one cluster. Files included in each cluster may then be processed together (batch processed). Such processing can be, for example, for data analysis, data mining, and/or other known or to be developed data processing. Accordingly, manual efforts required for processing the plurality of documents for various tasks are reduced while improving workflow consistency.

FIG. 1 illustrates a block diagram of an example network diagram according to some aspects of the present disclosure. As depicted in FIG. 1, the example environment 100 includes client devices 104, a server 106 and a remote database 102 that are communicatively coupled with each other via a network 108. In some examples, the network 108 may include, but is not limited to, a Local Area Network (LAN), a Wide Area Network (WAN), the Internet, or a combination thereof. In some examples, the network 108 may be accessed over a wired and/or a wireless communication link.

The remote database 102 may be in a cloud node maintained by a Cloud Service Provider (CSP) or a cloud vendor. The remote database 102 may store a plurality of documents that can be accessed by the server 106 and/or the client devices 104 for performing one or more operations, as described herein. In some examples, the operations may include data storage operations, data processing operations, and/or the like. The plurality of documents stored in the remote database 102 may be in PDF format, word format, or any other known or to be developed format.

In some examples, the computing resources at the server 106 may include network resources, data storage, servers, applications, and services. Example of the network resources may include routers, network bandwidth, network management software, and/or the like. Examples of the data storage may include storage resources, memory, Random Access Memory (RAM), databases, and/or the like. Examples of the servers may include processors, hardware servers, Virtual Machines (VMs), hypervisor, containers, and/or the like. Examples of the applications and services may include email applications, data collection/processing applications, accounting applications, Human Resource (HR) related applications, medical related applications, and/or the like. In some examples, the resources at the server 106 may include cloud resources, cloud computing resources, or the like.

The client devices 104 may be associated with the entity (also referenced herein as a user or operator, or the like) and used by users 110 of the client devices 104 (users may also be referred to as operators). In some examples, each of the users or operators may include an organization, a corporation, a business unit of a corporation, a department of a corporation, a banking unit, a medical/healthcare unit, and/or the like. In some examples, each of the users 110 may include an administrator, a subject matter expert (SME), an investigator, and/or the like. Examples of the client devices 104 may include a desktop, smartphones, laptops, a tablet, voice-enabled devices, and/or the like. It is contemplated that the implementations of the present disclosure may be realized with any appropriate type of computing device.

The client devices 104 may be utilized by a respective user of the users 110 to log into and interact with the server 106 for handling of data stored in the plurality of documents, which are stored in the remote database 102. The server 106 implements the automated pipeline that is configured to identify and categorize unique templates in each of the plurality of documents. Each document of the plurality of documents may be a PDF file. The server 106 is configured to perform pairwise comparison to group similar files into a plurality of clusters. As described herein, the same PDF file can be part of more than one cluster, and each cluster is configured to process the files included in that cluster as a batch process, for example, for data analysis, data mining, and/or data processing.

In some examples, the client devices 104 may display one or more Graphical User Interfaces (GUIs) that enable the respective user to interact with the server 106 and/or the remote database 102 for batch processing of the plurality of documents stored at the remote database 102. Interacting with the server 106 may include initiating a request to display a plurality of documents in a GUI and selecting two or more documents of the plurality of documents for batch processing. Alternatively, the server 106 may periodically perform batch processing of the plurality of documents.

In some examples, the server 106 may be implemented as an on-premises system. In some other examples, the server 106 may be implemented as an off-premises system (for example, a cloud or an on-demand system). Additionally, or alternatively, the server 106 may be implemented in a cloud environment. For simplicity, the server 106 depicted in FIG. 1 may be a cloud environment that is intended to represent various forms of servers including a web server, an application server, a proxy server, a network server, a server pool, and/or the like.

Figure 2:
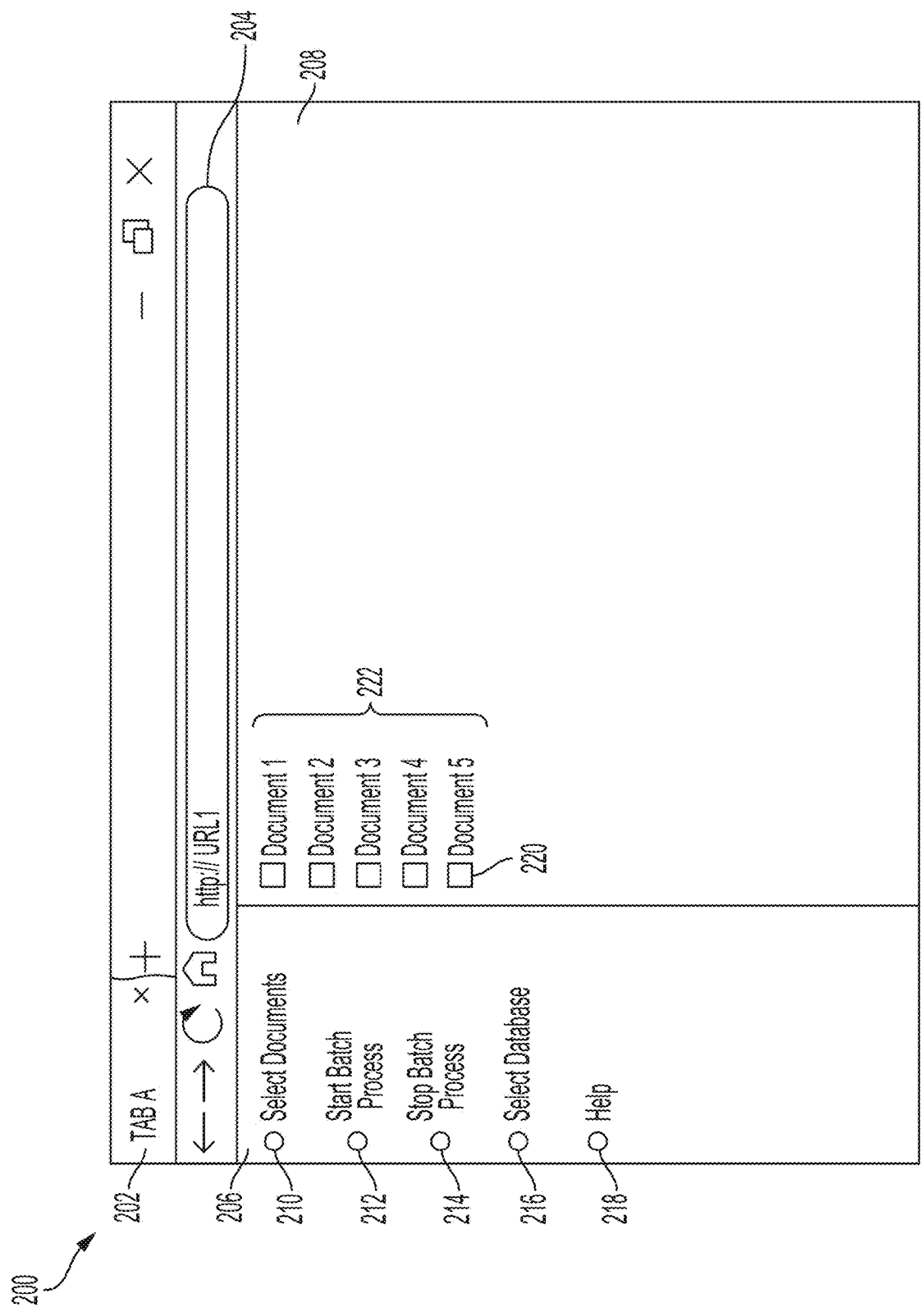
FIG. 2 illustrates an example view of a graphical user interface of a frontend application executing on a client device according to some aspects of the present disclosure.

FIG. 2 illustrates an example view 200 of a graphical user interface (GUI) of a frontend application executing on a client device 104 according to some aspects of the present disclosure. The frontend application may be a web browser application, a mobile application, or a native application executing on the client device 104. The frontend application executing on the client device 104 may be communicatively coupled with a backend application executing on the server 106. The backend application executing on the server 106 is communicatively coupled with the remote database 102. Additionally, or alternatively, the frontend application executing on the client device 104 may also be communicatively coupled with the remote database 102.

As shown in the view 200 of the GUI, the frontend application may connect with the backend application by accessing a uniform resource locator (URL) address in an address bar 204 of a tab 202. Upon establishing a connection between the frontend application and the backend application using HyperText Transfer Protocol (http) or HyperText Transfer Protocol Secure (https), the backend application executing on the server 106 may render a page for displaying on the GUI as shown in FIG. 2. The page rendered for display on the frontend application may include a menu selection pane 206 and a data display and selection pane 208 (a selection pane may also be referred to as a selection window, a selection frame, a selection section, etc.).

The menu selection pane 206 may display a plurality of menu options including, but not limited to, a select documents option 210, a start batch process option 212, a stop batch process option 214, a select database option 216, and a help option 218. The help option 218 may provide the user various information such as documentation about using the user interface shown in FIG. 2 for selecting various documents for batch processing, as described herein. The select database option allows the user to select a database, for example, to access the database stored in the remote database 102.

The database stores a plurality of documents, and upon selecting the database, a plurality of documents stored in the database are displayed in the data display and selection pane 208 by selecting the select documents option 210. Upon selection the select documents option 210, document 1, document 2, document 3, document 4, and document 5 are displayed in the data display and selection pane 208 as 222. One or more documents displayed in the data display and selection pane 208 may be selected using their respective checkbox that is shown in FIG. 2 as checkbox 220. The one or more documents such selected using a respective checkbox may be batch processed upon selecting the start batch process option 212. The stop batch process option 214, once selected, stops (terminates) the batch process, which may be for any reason. Batch processing of the selected documents is described below with reference to FIGS. 3, 4A-4B, 5A-5B, and 6.

Figure 3:
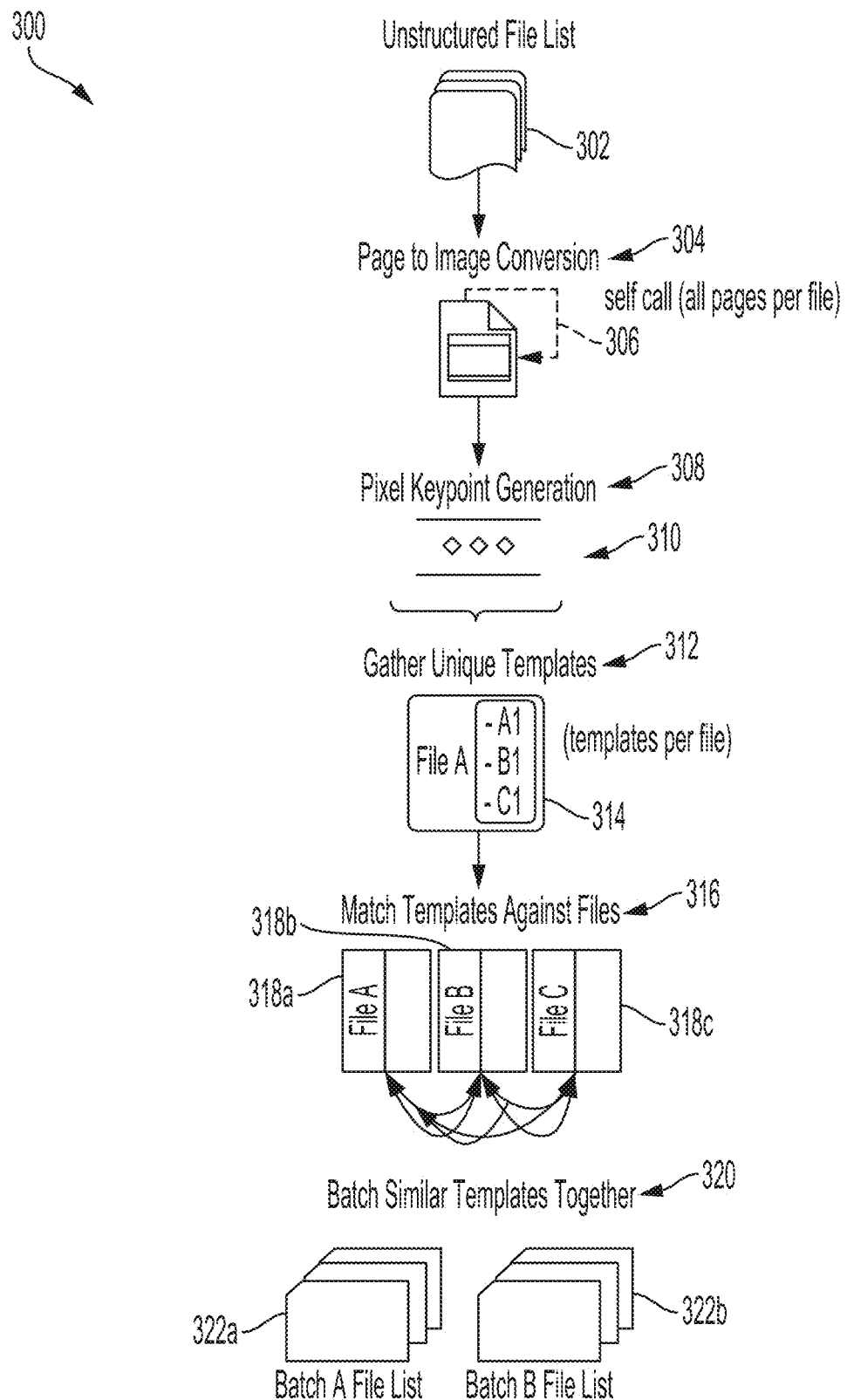
FIG. 3 illustrates an example flow diagram of a batching process according to some aspects of the present disclosure.

FIG. 3 illustrates an example flow diagram 300 of a batching process according to some aspects of the present disclosure. As shown in FIG. 3, the batching process flow starts for a plurality of documents selected by the user as described with reference to FIG. 2. The plurality of documents 302 may be selected for batch processing as shown in FIG. 3. The plurality of documents 302 may be in PDF file format; however, other file formats such as, word, etc., may also be batch processed. The plurality of documents 302 are accessed by the server 106 and stored, for example, in a local memory of the server 106.

Each page of each document of the plurality of documents 302 (unstructured file list) is converted using a known or to be developed conversion process 304 into an image (e.g., using a PDF to image converter tool). An example of the PDF to image converter tool may include Canva, PDF24 Tools, or another tool. Additionally, or alternatively, each page of each document of the plurality of documents 302 (unstructured file list) is converted using packages such as, but not limited to, pymupdf and/or opencv python, etc. Since packages like pymupdf and/or opencv are known to a person skilled in the art, details about converting a page into an image using these packages are not provided for sake of brevity.

As shown in FIG. 3, upon completion of such conversion, all pages for each PDF document are converted into images 306.

For each page of each document of the plurality of documents converted into an image, pixel key points and corresponding descriptors are generated using a process 308. Pixel key points and descriptors are generated, for example, using any known or to be developed process such as a feature detection algorithm like SIFT (Scale Invariant Feature Transform) or ORB (Oriented FAST and Rotated BRIEF) within a computer vision library like OpenCV. The SIFT or ORB algorithm identifies salient points in an image (referenced herein as key points) and then describes the local appearance around those points using a descriptor vector. Each descriptor vector effectively captures unique characteristics of respective each key point or a set of respective key points. The plurality of images and corresponding pixel key points and associated descriptors are saved in a database or memory of the server 106 for further processing.

Each pixel key point and associated descriptor is processed for the plurality of images of each document of the plurality of documents using processing 310. For instance, pixel key points and associated descriptors for each document are processed separately or individually using any known or to be developed process. By way of an example, pixel key points and associated descriptors for more than one page of a document, and/or two or more documents are processed, in parallel or near simultaneously, using a brute force k-nearest neighbors (KNN) algorithm.

Based upon the brute force KNN algorithm-based processing, a plurality of distances is computed that identifies similarities among all pages of the document, and/or two or more documents. Further, based upon the plurality of distances, an image homography space, and inliers and/or outliers of the distances (or descriptor distances) may be obtained (or computed) for further processing.

The further processing may include processing using an AdaBoost binary classifier to identify and label matching templates of pixel key points. The image homography space, as described herein, represents a mathematical representation of the relationship between two images of the same plane. The image homography space is a core concept in computer vision and multiple view geometry. The image homography corresponds with a projective transformation that describes how two images relate to each other, and can be used to correct, enhance, align, or preprocess the images.

Additionally, an inlier, as described herein, refers to a matched feature point pair between two images that closely aligns with the calculated homography transformation, meaning such inlier follows the expected geometric relationship between the images. On the other hand, an outlier, as described herein, refers to a matched point pair that significantly deviates from this calculated homography, indicating a potential mismatched feature or noise in the data.

Based on the processing 310 of the pixel key points and associated descriptors, one or more unique templates for each document of the plurality of documents are identified 312. In some examples, the inliers, outliers, descriptive summary statistics about the pixel key point and distances between the pixel key points, and Lowe's ratio test are used as input parameters for a classifier, for example, the AdaBoost Classifier. The training process of the AdaBoost Classifier entailed computing the summary statistics, as described above, for a dataset of pairwise image comparisons, and then labeling them in accordance with whether the images are matching. This classifier then uses the learned weights to make a binary (e.g., true or false) prediction whether two candidate images can be considered a match and retained as a template for the respective file, as described herein. The templates are retained for every file in memory until the unique templatized descriptor information per file is then once again used in a pairwise comparison in an attempt to obtain the highest similarity files into clusters.

In FIG. 3, one or more unique templates for each document of the plurality of documents may be determined, and one or more unique templates for a document of the plurality of documents are shown as templates 314 (e.g., A1, B1, and/or C1 in FIG. 3). Next, one or more unique templates of a documents are analyzed to determine whether a match for any one of the unique templates can be found in one or more other documents of the plurality of documents. This may be performed using a matching process 316. For example, each unique template of a first document 318a (e.g., A1, B1, and C1) is analyzed to determine whether any of unique templates A1, B1, and/or C1 is/are also present in a second document 318b and/or a third document 318c. The same process may be applied for any unique template identified in the second document 318b and/or the third document 318c. Descriptors for each unique template are retained or saved in one or more memories associated with the server 106.

Based on the matching process 316, two or more documents of the plurality of documents having a unique template are grouped or batched together using a batching process 320. Batching process 320 of two or more documents of the plurality of documents can be performed using any known or to be developed technique, including but not limited to, the brute force KNN match algorithm. In some examples, batching of two or more documents can also be based upon obtaining matching distances using Lowe's Ratio test and computing the least singular values and the minimum absolute value column sum for each respective distance vector. In some examples, distances may be said to be matching if the difference between any two or more distances is less than a configurable threshold, where the threshold is determined based on experiments and/or empirical studies.

The matching and batching phases, as described herein, are iterative in nature. Further, due to the similarity of steps, the same or similar summary statistics about the template can be used to determine whether two templates can be grouped together or can be in the same batch. In some examples, the configurable threshold for distances may be dynamically determined based on the results from the singular values and summary statistics where this threshold is used in quantifying the similarity between two templates. As a result, false positive matches from brute force KNN for "good matches" may be minimized. If the number of "good matches" is approximately close or exceeds a specific value, then the templates can be considered to be part of the same cluster or group.

For example, based upon the matching process 316, two batches of documents (e.g., batch 322a and batch 322b) may be formed or generated. Documents in each batch 322a or 322b may be processed during a batch process for editing and processing, as suggested by the user. One or more documents included for batch processing in the batch 322a may also be included in the batch 322b, and vice versa. Batch 322a and batch 322b may each be referred to as a cluster of documents, a set of documents, a group of documents, etc.

FIGS. 4A and 4B, and 5A and 5B illustrate examples of intra-file comparison (or matching) process and inter-file comparison (or batching) process using example images of pages of one or more documents. These examples are non-limiting and for illustration purposes only.

Figure 4B:
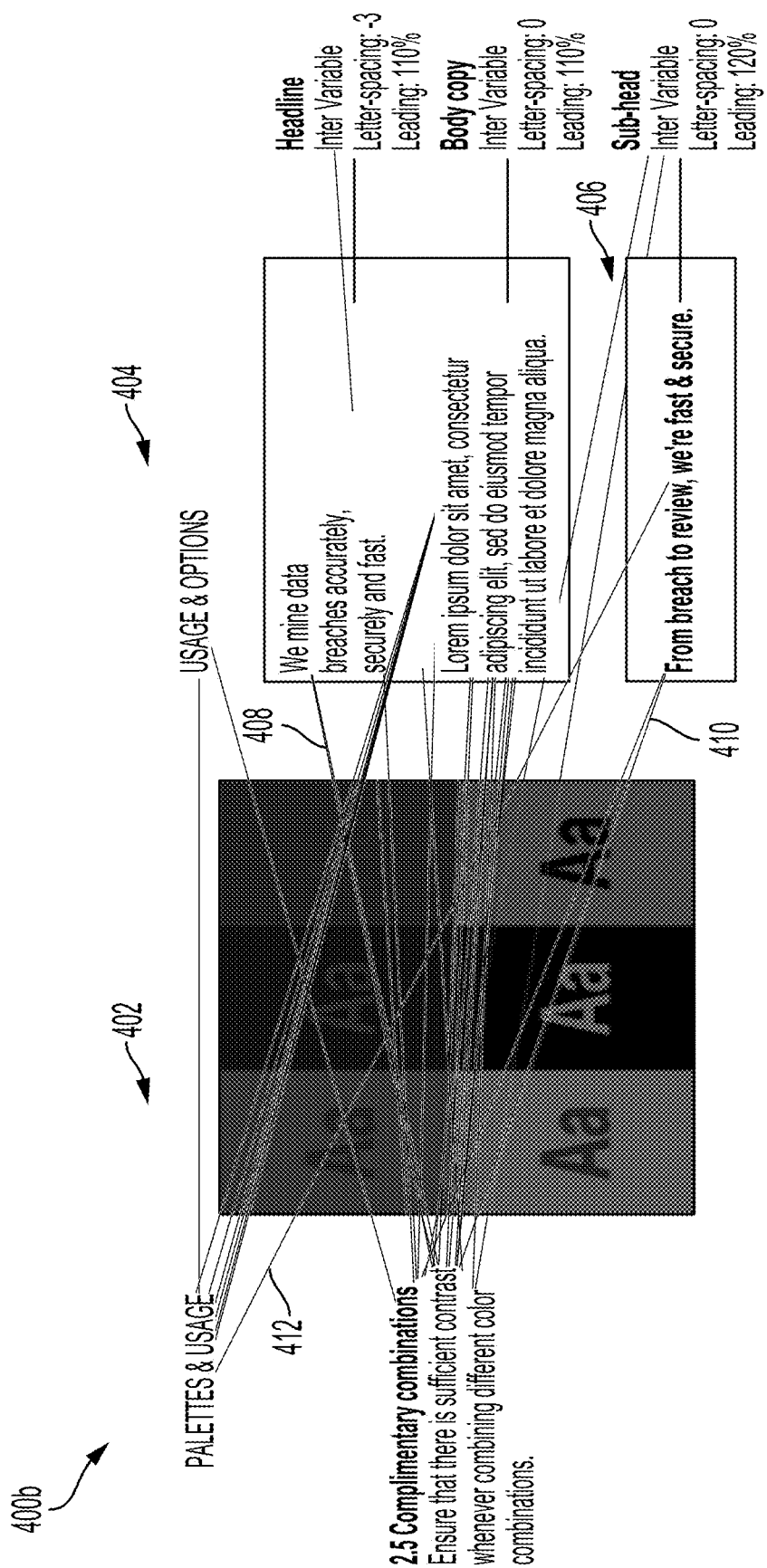
FIG. 4B illustrates an example view of structural dissimilarity between the two pages of the document shown in FIG. 4A according to some aspects of the present disclosure.

FIG. 4A illustrates an example view 400a of two pages (a page 402 and a page 404) of a document that are structurally different, and FIG. 4B illustrates an example view 400b of structural dissimilarity between the page 402 and the page 404 of the document shown in FIG. 4A according to some aspects of the present disclosure. Following the procedure, as described herein, with reference to steps 302-314 shown in FIG. 3, it can be concluded or determined that the matches, shown in FIG. 4B using line 406, line 408, line 410, and line 412, etc., between the page 402 and the page 404 are false positive, or any resemblance or matching between the page 402 and the page 402 is not sufficient for homography comparison. Accordingly, each of the page 402 and the page 404 may be considered to have a respective unique template.

Figure 5A:
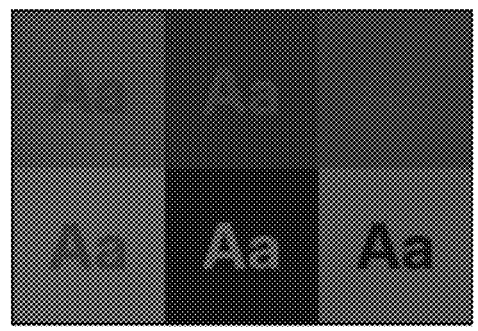
Figure 5A:
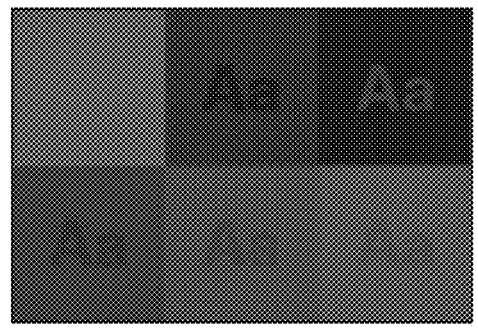
Figure 5B:
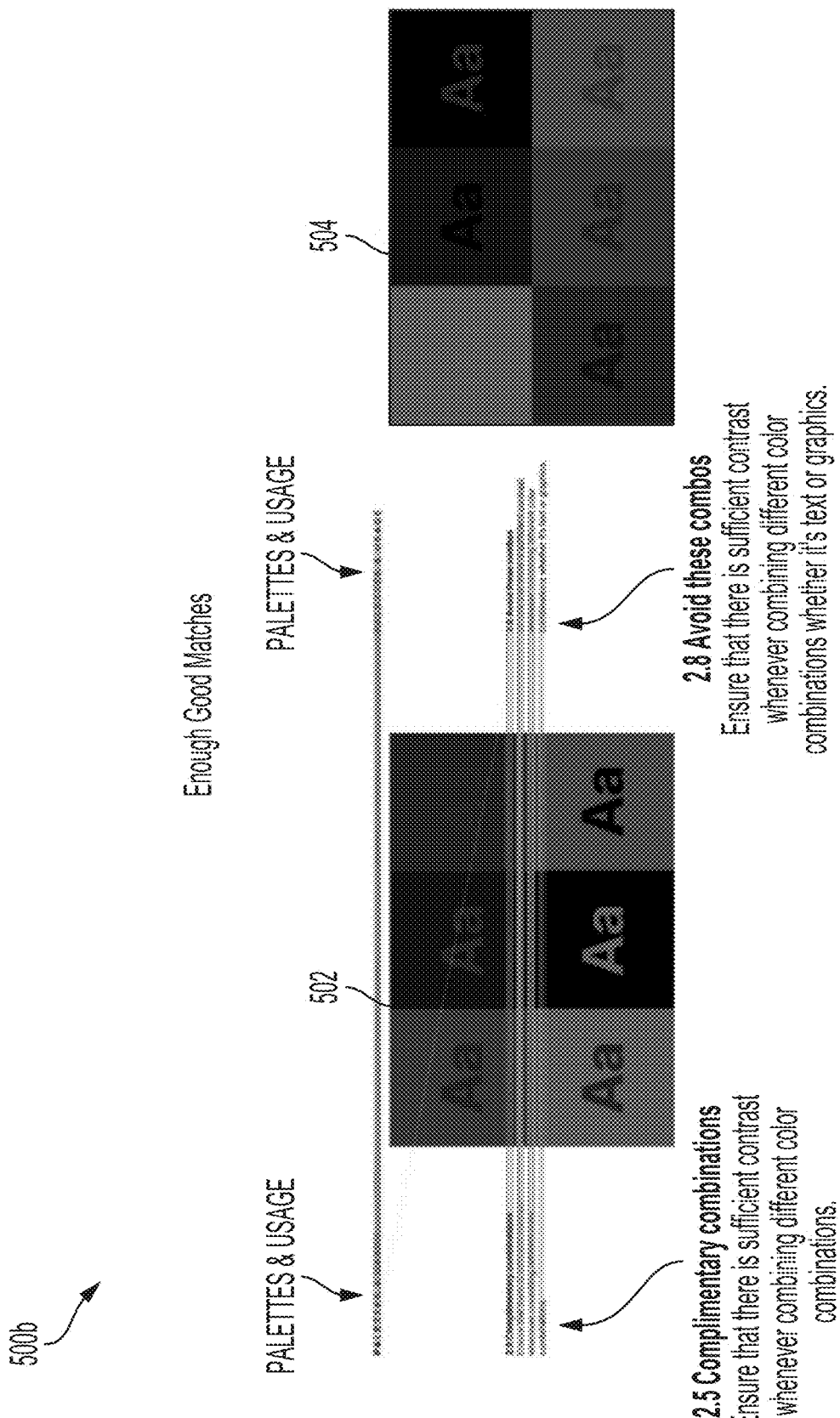
FIG. 5B illustrates an example view of structural similarity matches between the two pages of the document shown in FIG. 5A according to some aspects of the present disclosure.

FIG. 5A illustrates an example view 500a of two other pages (a page 502 and a page 504) of a document that are structurally similar, and FIG. 5B illustrates an example view 500b of structural similarity matches between the page 502 and the page 504 of the document shown in FIG. 5A according to some aspects of the present disclosure. Following the procedure, as described herein, with reference to steps 302-314 shown in FIG. 3, it can be concluded or determined that the matches between the page 502 and the page 504 are structurally similar and includes much of the same tabular formats, watermarks, and point of interests, etc. Additionally, based upon the pairwise comparison, it can be determined that the page 502 and the page 504 include same or similar templates. Accordingly, each of the page 502 and the page 504 may be considered having similar unique template and can be saved in the memory of the server 106 for the batching process.

Figure 6:
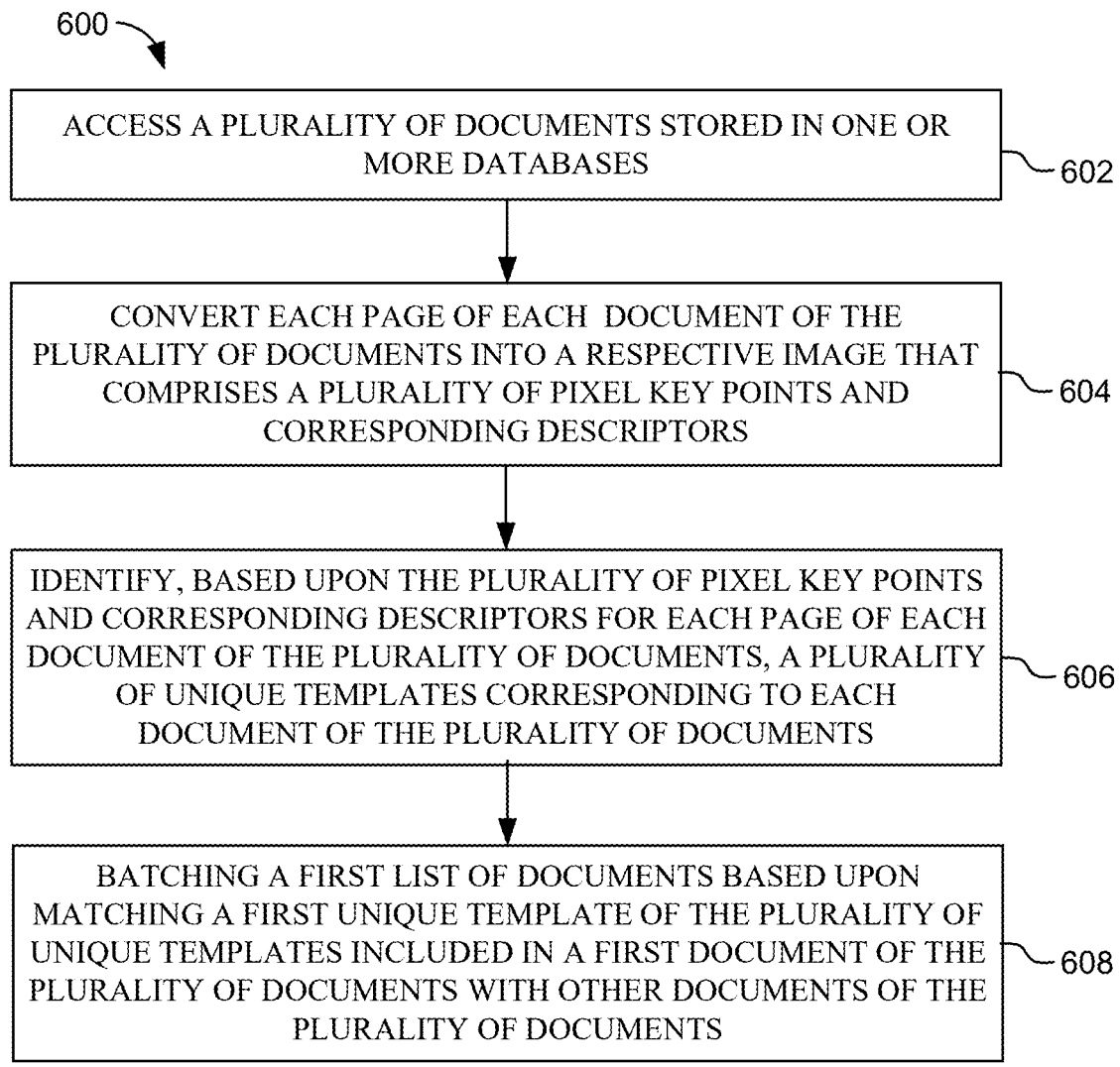
FIG. 6 illustrates an example flow chart 600 of a matching and batching process for template identification and matching for data analysis according to some aspects of the present disclosure.

FIG. 6 illustrates an example flow chart 600 of a matching and batching process for template identification and matching for data analysis according to some aspects of the present disclosure. The method operations can be performed by the server 106 and/or the client device 104. While steps of FIG. 6 are described below from the perspective of the server 106, the present disclosure is not limited thereto and any other known or to be developed processing component of a system such as that shown in FIG. 1 can perform the functionalities described below with reference to FIG. 6.

At step 602, the server 106 may access a plurality of documents. The plurality of documents is stored in one or more databases, which may be locally or remotely available at the server 106 and/or the client device 104 and may be accessed (or loaded) for processing as described above with reference to FIG. 2. The plurality of documents may be PDF format documents. Alternatively, or additionally, the plurality of documents may be word format documents, or any other format. In some examples, not all documents in the plurality of documents has the same format. For example, a first subset (e.g., one or more documents) from among the plurality of documents may be PDF format documents while a second subset (e.g., one or more different documents) may be in a word format, a TIF format, and/or any other known or to be developed format.

At step 604, the server 106 may convert each page of each document of the plurality of documents into a respective image. Each respect image may include a plurality of pixel key points and corresponding descriptors. As described herein, the plurality of pixel key points and corresponding descriptors are generated using an oriented fast and rotated brief (ORB) key point detector. Alternatively, or additionally, pixel key points and descriptors are generated, for example, using a feature detection algorithm like SIFT (Scale Invariant Feature Transform) algorithm.

At step 606, the server 106 may identify a plurality of unique templates corresponding to each document of the plurality of documents. The plurality of unique templates can be identified based upon the plurality of pixel key points and corresponding descriptors for each page of each document of the plurality of documents, as described above with reference to FIGS. 3-5A-B.

In one example, identifying the plurality of unique templates corresponding to each document of the plurality of documents includes comparing the plurality of pixel key points and corresponding descriptors for each page of the first document against a plurality of pixel key points and corresponding descriptors for one or more other pages of the first document. The plurality of pixel key points and corresponding descriptors are compared using a brute force KNN algorithm. Based on the comparing, a plurality of distances identifying similarity among all pages of the first document is generated. in accordance with the generated plurality of distances, an image homography space and inliers and outliers of the plurality of distances corresponding to all pages of the first document are obtained or identified. Based upon the identified or obtained image homography space and the inliers and outliers of the plurality of distances, a plurality of unique templates corresponding to the first document is identified.

At step 608, the server 106 may batch a first list of documents based upon matching a first unique template of the plurality of unique templates included in a first document of the plurality of documents with other documents of the plurality of documents. As described above with reference to FIGS. 3-5A-B, in one example, batching the first list of documents further includes comparing a descriptor associated with the first unique template with other descriptors of remaining unique templates of the plurality of unique templates corresponding to each document of the plurality of documents. The descriptors may be compared using a brute force KNN algorithm.

In some examples, each document of the first list of documents having the first unique template may be batched using a Lowe's ratio test. Additionally, or alternatively, a second list of documents may also be batched. The second list of documents may be batched based upon matching a second unique template of the plurality of unique templates included in the first document with other documents of the plurality of documents. Each of the first and/or second list of documents may be batch processed. As described herein, each template of the plurality of unique templates is compared using one or more structural properties. By way of an example, the one or more structural properties may include a tabular format, a watermark, and a point of interest on a page of the respective document or on a page of another document.

Upon completion of the batching process at step 608, the server 106 may perform any desired, programmed, and/or otherwise know or to be developed processing on batched documents. For instance, such processing can include identification and extraction of desired/specified data from the plurality of documents. Non-limiting examples of data identification and extraction are described in U.S. Non-Provisional patent application Ser. No. 19/066,964, filed on Feb. 28, 2025, entitled "Improved Character Recognition Techniques For Data Analysis In Large Sets of Documents"; and U.S. Non-Provisional patent application Ser. No. 19/066,809, filed on Feb. 28, 2025, entitled "Techniques for Targeted Data Extraction From Unstructured Sets of Documents"; the contents of which are hereby expressly incorporated by reference in their entirety.

Figure 7:
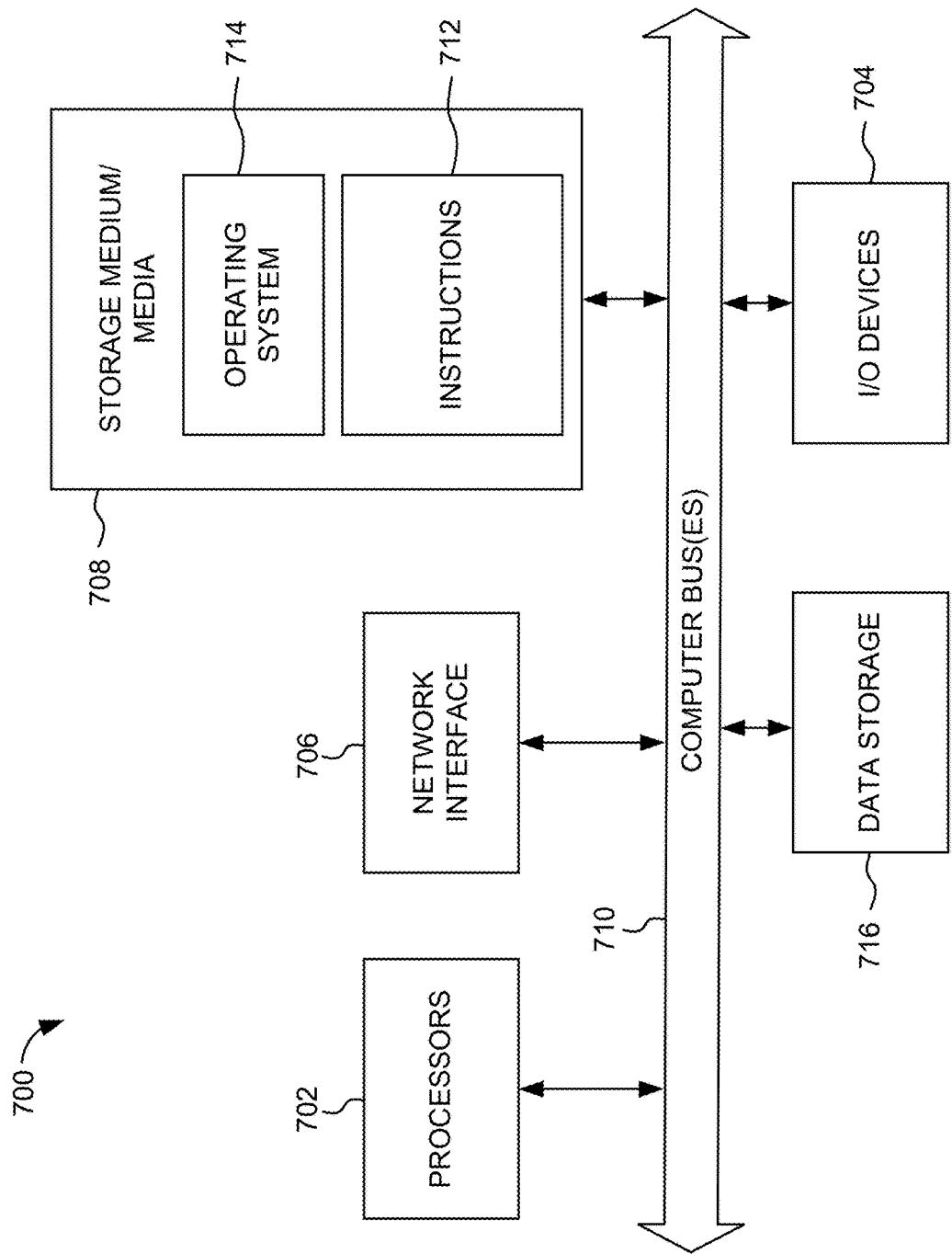
FIG. 7 illustrates an example of a computing system in accordance with certain embodiments.

FIG. 7 illustrates an example of a computing system 700 that may be used to implement embodiments as described herein, including the server 106 and/or the client device 104. The computing system 700 may include additional components not shown and that some of the process components described may be removed and/or modified. In another example, a computing system 700 may be deployed on external-cloud platforms such as cloud, internal corporate cloud computing clusters, organizational computing resources, and/or the like.

The computing system 700 includes processor(s) 702, such as a central processing unit, ASIC or another type of processing circuit, input/output devices 704, such as a display, mouse keyboard, etc., a network interface 706, such as a Local Area Network (LAN), a wireless 802.11x LAN, a 3G or 4G mobile WAN or a WiMax WAN, and a computer-readable medium 708. Each of these components may be operatively coupled to a bus 710.

The computer-readable medium 708 may be any suitable medium that participates in providing instructions to the processor(s) 702 for execution. For example, the computer-readable medium 708 may be non-transitory or non-volatile medium, such as a magnetic disk or solid-state non-volatile memory or volatile medium such as RAM. The instructions or modules stored on the computer-readable medium 708 may include machine-readable instructions 712 executed by the processor(s) 702 that cause the processor(s) 702 to perform the methods and functions performed by the server 106 and/or the client device 104.

The computing system 700 may be implemented as software stored on a non-transitory processor-readable medium and executed by the processor(s) 702. For example, the computer-readable medium 708 may store an operating system 714, such as MAC OS, MS WINDOWS, UNIX, or LINUX, and code, for the computing system 700. The operating system 714 may be multi-user, multiprocessing, multitasking, multithreading, real-time, and the like. For example, during runtime, the operating system 714 is running and the code for the computing system 700 is executed by the processor(s) 702.

The computing system 700 may include a data storage 716, which may include non-volatile data storage. The data storage 716 stores any data used or generated by the computing system 700.

The network interface 706 connects the computing system 700 to internal systems for example, via a LAN. Also, the network interface 706 may connect the computing system 700 to the Internet. For example, the computing system 700 may connect to web browsers and other external applications and systems via the network interface 706.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer may include a processor for performing instructions and one or more memory devices for storing instructions and data. The processor may be a central processing unit (CPU) or a graphics processing unit (GPU). Generally, a computer will also include or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor(s) 702 and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware, and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A computer-implemented method comprising:
    accessing, by one or more processors, a plurality of documents stored in one or more databases;
    converting, by the one or more processors, each page of each document of the plurality of documents into a respective image that comprises a plurality of pixel key points and corresponding descriptors;
    identifying, by the one or more processors, based upon the plurality of pixel key points and corresponding descriptors for each page of each document of the plurality of documents, a plurality of unique templates corresponding to each document of the plurality of documents; and
    batching, by the one or more processors, a first list of documents based upon matching a first unique template of the plurality of unique templates included in a first document of the plurality of documents with other documents of the plurality of documents,
    wherein identifying the plurality of unique templates corresponding to each document of the plurality of documents comprises:
    comparing, using a brute force k-nearest neighbors algorithm, the plurality of pixel key points and corresponding descriptors for each page of the first document against a plurality of pixel key points and corresponding descriptors for one or more other pages of the first document;
    based on the comparing, generating a plurality of distances identifying similarity among all pages of the first document;
    in accordance with the plurality of distances, obtaining an image homography space and inliers and outliers of the plurality of distances corresponding to all pages of the first document; and
    based upon the image homography space and the inliers and outliers of the plurality of distances, identifying the plurality of unique templates corresponding to the first document.

2. The computer-implemented method of claim 1, wherein converting each page of each document of the plurality of documents comprises generating the plurality of pixel key points and corresponding descriptors using an oriented fast and rotated brief (ORB) key point detector.

3. The computer-implemented method of claim 1, wherein batching the first list of documents based upon matching the first unique template further comprises:
    comparing, using a brute force k-nearest neighbors algorithm, a descriptor associated with the first unique template with other descriptors of remaining unique templates of the plurality of unique templates corresponding to each document of the plurality of documents; and
    based on the comparing, batching each document of the first list of documents having the first unique template.

4. The computer-implemented method of claim 3, the first list of documents having the first unique template is batched using a Lowe's ratio test.

5. The computer-implemented method of claim 1, further comprising:
    batching, by the one or more processors, a second list of documents based upon matching a second unique template of the plurality of unique templates included in the first document with other documents of the plurality of documents.

6. The computer-implemented method of claim 5, wherein each of the second list of documents is batch processed.

7. The computer-implemented method of claim 1, wherein each of the first list of documents is batch processed.

8. The computer-implemented method of claim 1, wherein a first subset of the plurality of documents has a first format that is different than a second format of a second subset of the plurality of documents.

9. A system comprising:
    at least one memory configured to store computer-readable instructions; and
    at least one processor communicatively coupled with the at least one memory, and configured
    to execute the computer-readable instructions to:
    access a plurality of documents stored in one or more databases communicatively coupled with the at least one processor;
    convert each page of each document of the plurality of documents into a respective image that comprises a plurality of pixel key points and corresponding descriptors;
    identify, based upon the plurality of pixel key points and corresponding descriptors for each page of each document of the plurality of documents, a plurality of unique templates corresponding to each document of the plurality of documents; and
    batch a first list of documents based upon matching a first unique template of the plurality of unique templates included in a first document of the plurality of documents with other documents of the plurality of documents,
    wherein to identify the plurality of unique templates corresponding to each document of the plurality of documents, the at least one processor is configured to execute the computer-readable instructions to:
    compare, using a brute force k-nearest neighbors algorithm, the plurality of pixel key points and corresponding descriptors for each page of the first document against a plurality of pixel key points and corresponding descriptors for one or more other pages of the first document;
    based on the comparing, generate a plurality of distances identifying similarity among all pages of the first document;
    in accordance with the plurality of distances, obtain an image homography space and inliers and outliers of the plurality of distances corresponding to all pages of the first document; and based upon the image homography space and the inliers and outliers of the plurality of distances, identify the plurality of unique templates corresponding to the first document.

10. The system of claim 9, wherein the at least one processor is configured to execute the computer-readable instructions to generate the plurality of pixel key points and corresponding descriptors using an oriented rotated brief key point detector.

11. The system of claim 9, wherein to batch the first list of documents based upon matching the first unique template, the at least one processor is configured to execute the computer-readable instructions to:
 compare, using a brute force k-nearest neighbors algorithm, a descriptor associated with the first unique template with other descriptors of remaining unique templates of the plurality of unique templates corresponding to each document of the plurality of documents; and
 based on the comparing, batch each document of the first list of documents having the first unique template.

12. The system of claim 11, wherein the at least one processor is configured to execute the computer-readable instructions to batch the first list of documents having the first unique template using a Lowe's ratio test.

13. The system of claim 9, wherein the at least one processor is configured to execute the computer-readable instructions to batch a second list of documents based upon matching a second unique template of the plurality of unique templates included in the first document with other documents of the plurality of documents.

14. The system of claim 13, wherein each of the second list of documents is batch processed.

15. The system of claim 9, wherein each of the first list of documents is batch processed.

16. The system of claim 9, wherein a first subset of the plurality of documents has a first format that is different than a second format of a second subset of the plurality of documents.

17. One or more non-transitory computer-readable media comprising machine-readable instructions stored thereon, which, when executed by at least one processor of at least one computing device communicatively coupled with one or more databases, cause the at least one processor to:
 access a plurality of documents stored in the one or more databases;
 convert each page of each document of the plurality of documents into a respective image that comprises a plurality of pixel key points and corresponding descriptors;
 identify, based upon the plurality of pixel key points and corresponding descriptors for each page of each document of the plurality of documents, a plurality of unique templates corresponding to each document of the plurality of documents; and
 batch a first list of documents based upon matching a first unique template of the plurality of unique templates included in a first document of the plurality of documents with other documents of the plurality of documents,
 wherein to identify the plurality of unique templates corresponding to each document of the plurality of documents, the at least one processor is configured to execute the computer-readable instructions to:
 compare, using a brute force k-nearest neighbors algorithm, the plurality of pixel key points and corresponding descriptors for each page of the first document against a plurality of pixel key points and corresponding descriptors for one or more other pages of the first document;
 based on the comparing, generate a plurality of distances identifying similarity among all pages of the first document;
 in accordance with the plurality of distances, obtain an image homography space and inliers and outliers of the plurality of distances corresponding to all pages of the first document; and
 based upon the image homography space and the inliers and outliers of the plurality of distances, identify the plurality of unique templates corresponding to the first document.

18. The one or more non-transitory computer-readable media of claim 17, wherein the machine-readable instructions, which, when executed by the at least one processor, cause the at least one processor to batch a second list of documents based upon matching a second unique template of the plurality of unique templates included in the first document with other documents of the plurality of documents.

* * * * *